United States Patent
Heinz et al.

(10) Patent No.: US 10,078,147 B2
(45) Date of Patent: Sep. 18, 2018

(54) DETECTOR

(71) Applicant: The United States of America, as represented by the Secretary of the Army, Washington, DC (US)

(72) Inventors: Daniel Charles Heinz, Perry Hall, MD (US); Adam William Melber, Churchville, MD (US); Michael Leonard Brennan, Howell, NJ (US); Michael Steer, Raleigh, NC (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 716 days.

(21) Appl. No.: 14/333,593

(22) Filed: Jul. 17, 2014

(65) Prior Publication Data
US 2016/0018552 A1 Jan. 21, 2016

(51) Int. Cl.
*G01R 33/14* (2006.01)
*G01V 3/10* (2006.01)

(52) U.S. Cl.
CPC ........................ *G01V 3/10* (2013.01)

(58) Field of Classification Search
CPC ............. G01V 3/12; G01V 3/107; G01V 3/10
USPC ........................................................ 324/329
See application file for complete search history.

(56) References Cited

U.S. PATENT DOCUMENTS

| | | | |
|---|---|---|---|
| 4,012,690 A * | 3/1977 | Heytow | G01V 3/105 324/243 |
| 6,081,238 A * | 6/2000 | Alicot | G08B 13/2471 343/742 |
| 7,061,236 B2 | 6/2006 | Britton | |
| 8,618,796 B2 | 12/2013 | Teppan et al. | |
| 2011/0181276 A1 | 7/2011 | Moskalenko | |
| 2011/0187362 A1 | 8/2011 | Ahn | |
| 2012/0179394 A1 | 7/2012 | Kittel et al. | |
| 2013/0154649 A1 | 6/2013 | Candy | |
| 2014/0111019 A1* | 4/2014 | Roy | G01V 3/081 307/104 |
| 2014/0266183 A1 | 9/2014 | Nishida et al. | |

OTHER PUBLICATIONS

Overton, et al., Inside the Metal Detector, 2012, Geotech Press, pp. viii, 13, and 17.
(Continued)

*Primary Examiner* — Reena Aurora
(74) *Attorney, Agent, or Firm* — Ronald Krosky; Azza Jayaprakash (57) ABSTRACT

Various embodiments are described that relate to a detector. The detector can include a loop functioning at a high frequency that emits a magnetic field. The magnetic field can be retrieved and a comparison can be made between the emitted magnetic field and the retrieved magnetic field. If there is substantially little difference between the emitted and retrieved field, then a determination can be that no object is present. Conversely, if there is a substantial difference between the emitted and retrieved field, then the determination can be that an object is present and thus the object is detected. If the object is present, the returned magnetic field can be further analyzed to determine the type of object that is detected.

20 Claims, 12 Drawing Sheets

(56) References Cited

OTHER PUBLICATIONS

Heinz et al., "Constant phase uniform current loop for detection of metallic objects using longitudinal magnetic field projection," SPIE Defense, Security and Sensing Conference, Proc. SPIE 8709, Detection and Sensing of Mines, Explosive Objects, and Obscured Targets XVIII, Jun. 7, 2013.
QRP Mag Loop Tuner (80-20m)—G8ODE, http://rsars.files.wordpress.com/2013/01/qrp-loop-tuner-80-20m-g8ode-iss-1-32.pdf, Dec. 2012.
Heinz, et al., "High to very high-frequency metal/anomaly detector", SPIE Defense+ Security (pp. 907209-907209). International Society for Optics and Photonics. May 2014.
Burke, et al. "Numerical Electromagnetics Code (NEC)—Method of Moments, Part III: User's Guide." Lawrence Livermore National Laboratory, 1981. Up to p. 96 first attachment and p. 97 to end second attachment.
Welcome to Graham Maynard's Electronic Projects Web Site, http://bovan.net/gmweb2 (Archive of http://gmweb2.net/), Accessed Feb. 24, 2015, Dated Mar. 12, 2011.
Overton, et al.; Inside the Metal Detector; pp. viii, 13, & 17; Copyright 2012; Geotech Press, Sweet Home, OR.

\* cited by examiner

DETECTOR

GOVERNMENT INTEREST

The innovation described herein may be manufactured, used, imported, sold, and licensed by or for the Government of the United States of America without the payment of any royalty thereon or therefor.

BACKGROUND

A popular activity can be attempting to find an item. In one example, tourists can visit an old battlefield to try to discover remnants of the battle. These tourists can attempt to find old bullets, former clothing items such as belt buckles, rank insignia, and other physical items to take home as souvenirs. Items can at times be difficult to find as some items may be buried underground.

SUMMARY

In one embodiment, a system comprises a loop and a detection component. The loop can be configured to emit a magnetic field along a longitudinal axis of the loop. The loop can operate at a frequency of about 100 kilohertz or greater. The detection component can be configured to detect a presence of an object through an analysis of the magnetic field.

In one embodiment, a system comprises a singular loop, an identification component, a classification component, and an output component. The singular loop can operate at a frequency of about 1 megahertz or greater, where the singular loop is configured to emit a magnetic field along a longitudinal axis of the singular loop and where the singular loop functions concurrently as a transmission loop and as a reception loop. The identification component can be configured to identify a new location for a frequency notch associated with the frequency based on reception of the magnetic field, where the frequency notch moves from a base location to the new location and where a change of the location from the base location to the new location indicates a presence of an object. The classification component can be configured to determine a classification for the object based, at least in part, on the new location. The output component can be configured to cause an output associated with the classification.

In one embodiment, a system comprises a loop, an identification component, and an output component. The loop operates at a frequency of about 100 kilohertz or greater to about 1 gigahertz or lower. The loop is configured to receive a magnetic field. The identification component is configured to identify a new location for a frequency notch associated with the frequency based on reception of the magnetic field, where the frequency location moves from a base location to the new location and where the change of the location indicates an anomaly associated with the magnetic field. The output component is configured to cause an output associated with the anomaly.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

A metal and/or anomaly detector can be employed to identify a presence of an object. The detector can include a high-Q tuned loop antenna to use for metal/anomaly detection. The detector can measure a return loss and/or a voltage standing wave ratio and through this measurement, the detector can detect a frequency notch. Phase and/or amplitude response can be monitored to provide object detection. This phase and/or amplitude monitoring technique can be used to ground balance the detector. As a metal object is moved along the longitudinal axis of the loop antenna, a substantial shift in the frequency notch (e.g., phase and/or amplitude of the notch) occurs that the detector detects. For metal targets, the frequency shift can be positive and for ferrite and other targets, the frequency shift can be negative. This frequency shift can be created by the proximity of the target, causing a change in the impedance of the loop antenna. Long-range detection can occur with relatively low power requirements. In one example, the loop antenna is a singular loop with one winding can be used to transmit and receive. However, multiple loops and/or multiple windings can also be employed. The loop can function at a high to very high frequency (HF to VHF).

The detector can use a simple high-Q tuned loop antenna design with a canonical architecture. The loop antenna can be connected to a matching network with a particular arrangement that resonates with the loop antenna and produces an appropriate response of a reflection coefficient notch. The matching network is driven by a 50 Ohm source and 50 Ohm coaxial cable. The matching network can transform the loop impedance to 50 Ohm so that there is a notch with respect to frequency of the reflection coefficient looking into the matching network. The matching network can be designed so that the frequency of the notch shifts in a predictable manner when an object is placed in an aperture of the loop antenna. The impedance looking into the loop antenna can be defined as R+jX, where the resistance R is relatively independent of the presence of the target. The reactance X, however, can be relatively dependent on the target. With a metal target, X can become more capacitive and with a dielectric target, X can become more inductive. A ferrite target can become more inductive and loss can also increase significantly. The detector can be calibrated without a target and function with the matching network. After calibration, a change in the reflection coefficient for a metal target can increase the frequency of the reflection coefficient notch. Similarly, a change in the reflection coefficient for the non-metal target can decrease the frequency of the reflection coefficient notch and loss can increase significantly. Thus, employing aspects disclosed herein can combine a small reactance shift along with a significant frequency shift.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

Figure 1:
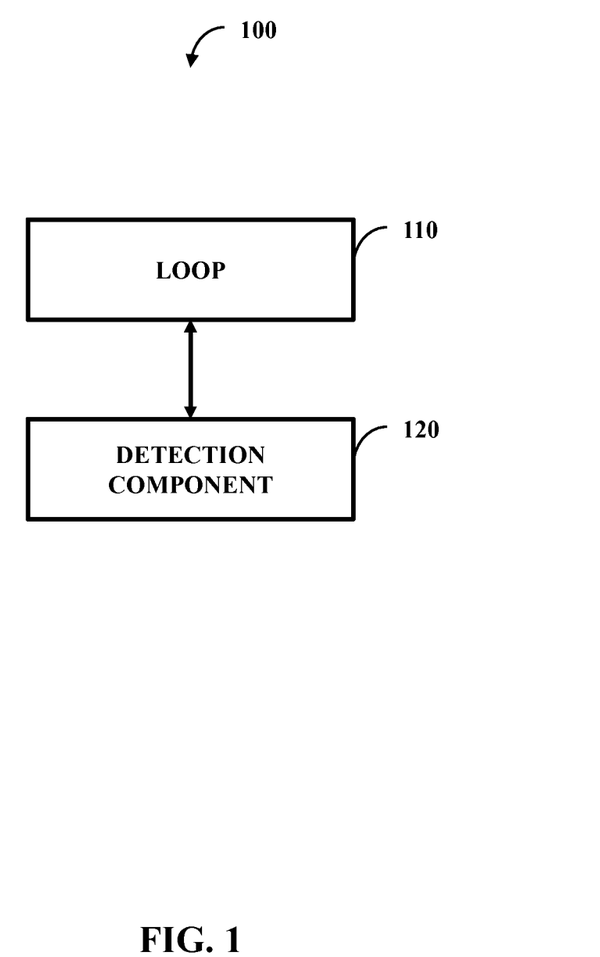
FIG. 1 illustrates one embodiment of a system comprising a loop and a detection component.

FIG. 1 illustrates one embodiment of a system 100 comprising a loop 110 and a detection component 120. The loop 110 can operate at a frequency of about 100 kilohertz or greater. A tuner component can be employed to tune a quality level (Q) of the loop to a desired bandwidth range. In addition, the loop 110 can be configured to emit a magnetic field along a longitudinal axis of the loop. The detection component 120 can be configured to detect a presence of an object through an analysis of the magnetic field.

In one embodiment, the loop receives a returned magnetic field that is a returned version of the magnetic field that is emitted by the loop 110. The detection component 120 can be configured to detect the presence of the object through identification of a phase change between the emitted magnetic field and the returned magnetic field. In one example, absent an object being present, the returned magnetic field is substantially unchanged from the emitted magnetic field. This is because nothing is present to change the returned magnetic field. Conversely, if an object is present (e.g., metal or dielectric), then that object influences the magnetic field and the returned magnetic field is substantially changed from the emitted magnetic field. The detection component 120 can make a comparison of the two magnetic fields and determine that the object is present.

In one embodiment, the detection component 120 can be configured to detect the presence of the object through a recognition of an impedance plot change between the emitted magnetic field and the returned magnetic field. In one embodiment, the detection component 120 performs identification of the impedance plot change through use of a reflection coefficient chart (e.g., a Smith chart).

Figure 2:
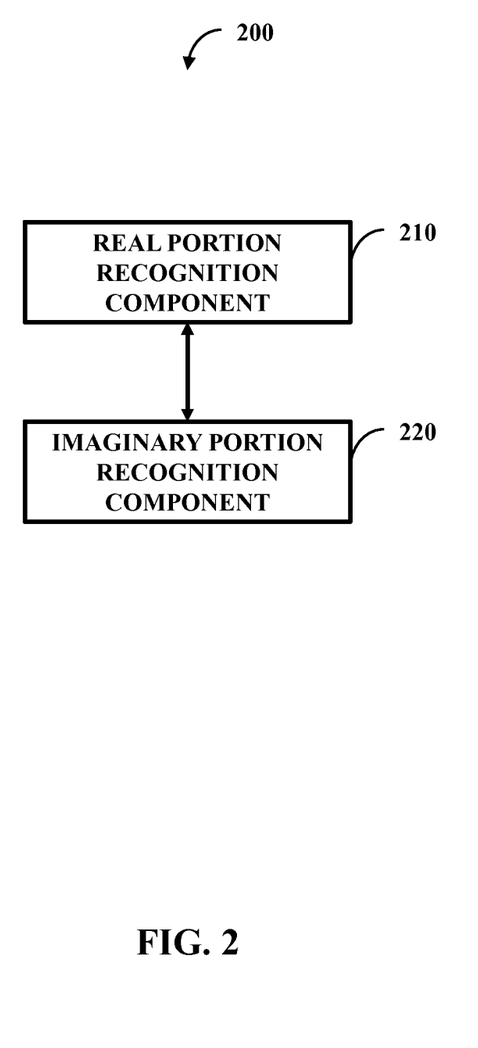
FIG. 2 illustrates one embodiment of a system comprising a real portion recognition component and an imaginary portion recognition component.

FIG. 2 illustrates one embodiment of a system 200 comprising a real portion recognition component 210 and an imaginary portion recognition component 220. The real portion recognition component 210 can be configured to recognize a real part of the impedance plot change by way of a first tone that is emitted by the loop 110 of FIG. 1. Along with the first tone, the loop can 110 of FIG. 1 can emit a second tone that is different from the first tone. The imaginary portion recognition component 220 can be configured to recognize an imaginary part of the impedance plot change by way of the second tone. The recognition of the impedance plot change by the detection component 120 of FIG. 1 can occur through use of the real part and the imaginary part. In one example, with the imaginary part and the real part recognized, the detection component 120 of FIG. 1 can look-up a value for a combination of the real part with the imaginary part and this combination can indicate presence of the object and/or provide specific information on the object (e.g., the combination an indicate if the object is a metal or dielectric). In one embodiment, the real portion recognition component 210 and/or the imaginary portion recognition component 220 are part of the detection component 120 of FIG. 1.

Figure 3:
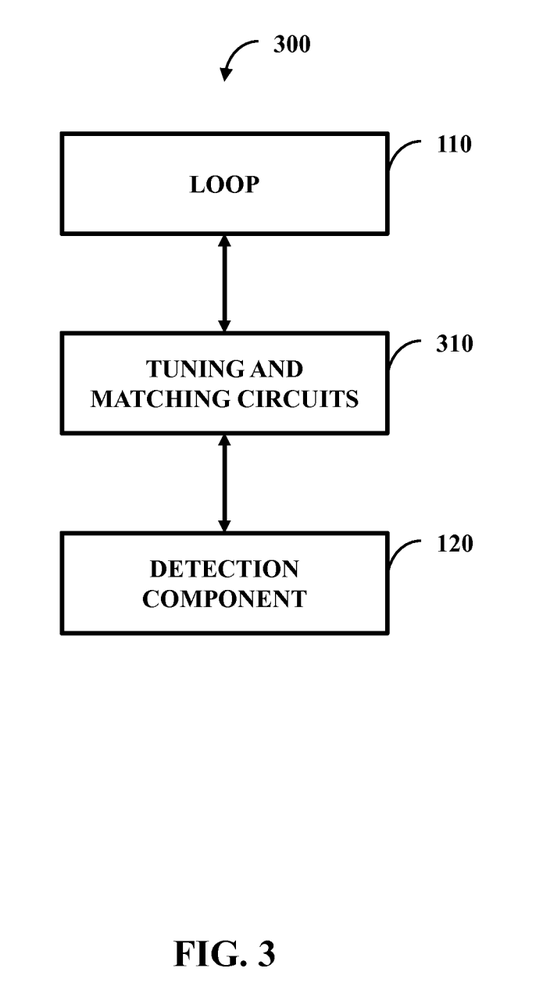
FIG. 3 illustrates one embodiment of the loop, tuning and matching circuits, and the detection component.

FIG. 3 illustrates one embodiment of the loop 110, tuning and matching circuits 310, and the detection component 120. The tuning and matching circuits 310 (e.g., a set of tuning and matching circuits that comprise one or more tuning and matching circuit) can be a set of capacitors that are configured to match an impedance of the loop 110 with impedance of a power supply that supplies power to the loop. The impedance for the system 300 can be represented by (when the tuning and matching circuits 310 comprise three capacitors C1, C2, & C3):

$$(U) Z_{Total} = \frac{1}{j\omega C_1} + \left[ j\omega C_2 + \left( \frac{1}{j\omega L + R + \frac{1}{j\omega C_3}} \right) \right]^{-1} \quad (1)$$

where impedance for the loop 110 can be:

$$(U) Z_{loop} = j\omega L + R \quad (2)$$

with R being the real part recognized by the real portion recognition component 210 of FIG. 2 and L being the imaginary part recognized by the imaginary portion recognition component 220 of FIG. 2. The impedance can be determined by looking into the loop 110.

Figure 4:
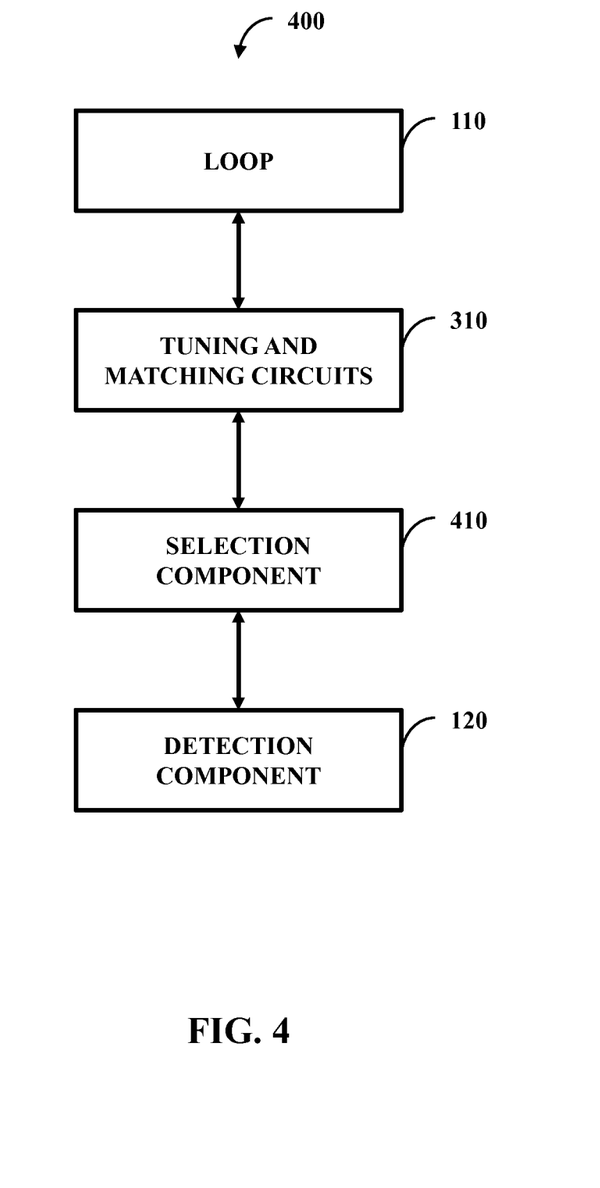
FIG. 4 illustrates one embodiment of a system comprising the loop, the tuning and matching circuits, a selection component, and the detection component.

FIG. 4 illustrates one embodiment of a system 400 comprising the loop 110, the tuning and matching circuits 310, a selection component 410, and the detection component 120. The selection component 410 can be configured to select a value set for the tuning and matching circuits 310. The tuning and matching circuits 310, when implemented with the value set, can cause the impedance to match the impedance of the power supply discussed in FIG. 3. The loop 110 and the power supply can be evaluated and based on a result of this evaluation, the selection component 410 can select the value set such that impedances match.

Figure 5:
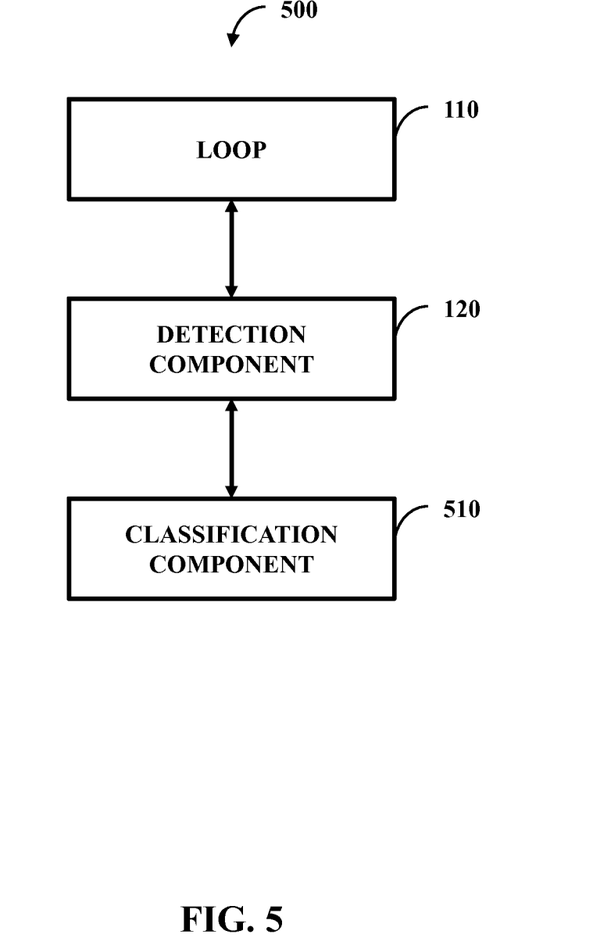
FIG. 5 illustrates one embodiment of a system comprising the loop, the detection component, and a classification component.

FIG. 5 illustrates one embodiment of a system 500 comprising the loop 110, the detection component 120, and a classification component 510. The detection component 120 can be configured to detect the presence of the object through detection of a frequency notch shift of a frequency notch associated with the frequency of the loop 110. The classification component 510 can be configured to make a classification for the object based, at least in part, on a location of the frequency notch shift. The frequency notch can be a graphical illustration of the frequency and the shift can be an illustration of the frequency change. The frequency notch shift can be produced from the object changing an impedance of the loop 110.

In one embodiment, the classification can be as a metal when the frequency notch shift is at a first value. Similarly, the classification can be as a non-metal (e.g., dielectric) when the frequency notch shift is at a second value different from the first value. In one example, the classification component 510 can have access to a look-up table. Entries in the look-up table can show correspondence between values and classifications. For example, a first range of values can be given for a metal classification and a second range of values can be given for a non-metal classification. A value can be identified by the classification component 510 and the classification component 510 can find the value in the first range or the second range. Based on a result of this finding, the classification component 510 can determine if a metal or non-metal object is present.

In one embodiment, absent the presence of the object the frequency notch can be at a base value. The classification component 510 can make the classification of a metal when the base value of the frequency notch increases. In addition, the classification component 510 can make the classification of a non-metal when the base value of the frequency notch decreases.

In one embodiment, the selection component 410 of FIG. 4 can select values for the tuning and matching circuits 310 of FIG. 4 such that the base value of the frequency notch is at a desired value. In one example, a desired base value of the notch can be at about 24.052 MHz (Megahertz). The capacitors can be set such that C1 is equal to about 7.752349 pF while C2 and C3 can be set to about 33.4 pF. At its base value when no object is present the impedance of the loop can be equal to about 50 Ohms. The frequency notch can increase to about 24.135 MHz and as such, the impedance can change to about 60.2+j82.9 Ohms. This change in the notch and/or the impedance can be indicative of an object being present. Similarly, the frequency notch can decrease to about 23.885 MHz and as such, the impedance can change to about 30.5−j127.5 Ohms. This change in the notch and/or the impedance can be indicative of an object being present.

The detection component 120 can identify one of these changes to identify the presence of the object.

Figure 6:
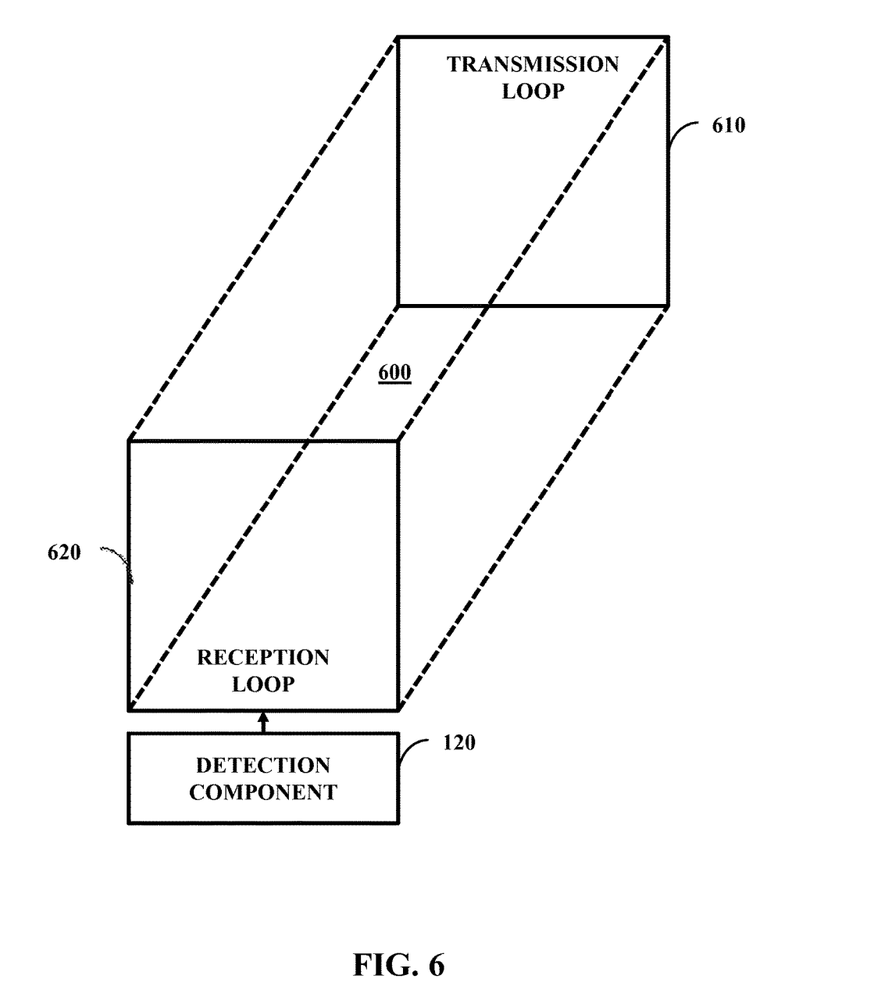
FIG. 6 illustrates one embodiment of a system comprising a transmission loop, a reception loop, and the detection component.

FIG. 6 illustrates one embodiment of a system 600 comprising a transmission loop 610, a reception loop 620, and the detection component 120. The loop 110 of FIG. 1 can function as the transmission loop 610. The reception loop 620 can be configured to receive the magnetic field from the transmission loop 610. The detection component 120 can be operatively coupled to the reception loop 620 and/or the transmission loop 610. The detection component 120 can detect the presence of the object through use of the magnetic field that is received by the reception loop 620 from the transmission loop 610.

In one embodiment, the presence is detected when the object passes between the transmission loop 610 and the reception loop 620. In this manner, the magnetic field can transfer from the transmission loop 610 to the reception loop 620. When the magnetic field sent by the transmission loop 610 is disturbed by the object, the magnetic field received by the reception loop 620 can be different from the magnetic field sent by the transmission loop 610. The detection component 120 can compare the sent and received magnetic fields and based on the comparison, determine that the object is between the loops 610 and 620. The system 600 can function such that the object is detected when the object is not between the loops 610 and 620.

Figure 7:
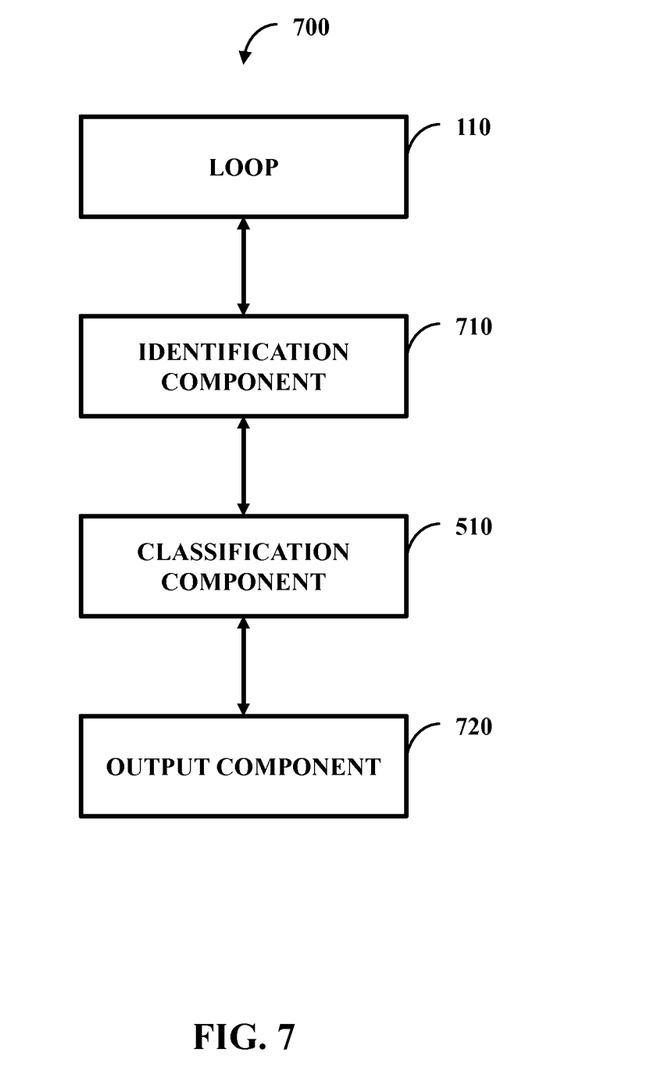
FIG. 7 illustrates one embodiment of a system comprising the loop, an identification component, the classification component, and an output component.

FIG. 7 illustrates one embodiment of a system 700 comprising the loop 110, an identification component 710, the classification component 510, and an output component 720. The loop 110 can be a singular loop (one loop), multiple loops (two or more loops), a loop set (one or more loops) with wire winding, etc. The loop 110 can function concurrently as the transmission loop 610 of FIG. 6 (e.g., to emit the magnetic field) and as the reception loop 620 of FIG. 6 (e.g., to receive the magnetic field), function as the transmission loop 610 of FIG. 6, or function as the reception loop 620 of FIG. 6. In one embodiment, the system 700 can comprise the tuning and matching circuits 310 of FIG. 3 that are configured to match an impedance of the loop 110 with a power supply (e.g., a power supply that operates at about 1 MHz or greater with a source impedance of about 25 Ohms or less) that supplies power to the loop 110. The loop 110 can operate at a frequency of about 100 kHz or greater (e.g., 1 MHz or greater, at least about 100 kHz and not more than about 1 gigahertz) and be configured to emit a magnetic field along a longitudinal axis of the loop 110.

The identification component 710 can be configured to identify a new location for a frequency notch associated with the frequency based on reception of the magnetic field. The frequency notch moves from a base location to the new location resulting in a location change for the frequency notch. Absent the presence of the object, the frequency notch can be at the base location. The frequency notch can shift from the base location to the new location due to the object changing an impedance of the loop 110. The location change for the frequency notch can be from the base location to the new location. The location change can indicate an anomaly associated with the magnetic field, such as indicating the presence of the object.

The classification component 510 can be configured to determine that the anomaly is the presence of the object and/or be configured to determine a classification for the object based, at least in part, on the new location. The classification can be of a metal when the new location increases from the base location. Additionally, the classification can be of a non-metal when the new location decreases from the base location. Based on a specific value of the new location, the classification component 510 can determine a metal or non-metal type.

The output component 720 can be configured to cause an output associated with the classification. In one example, a light can flash on a portion of a metal detector handle and/or a sound can emit from a speaker when the anomaly is detected. In one example, text can be presented on a display that indicates the classification. The classification can be as a metal or non-metal (e.g., text reads 'metal') as well as be more specific (e.g., list a non-metal type). Other information can be provided as well by the output component, such as a depth of the object if the object is underground.

Figure 8:
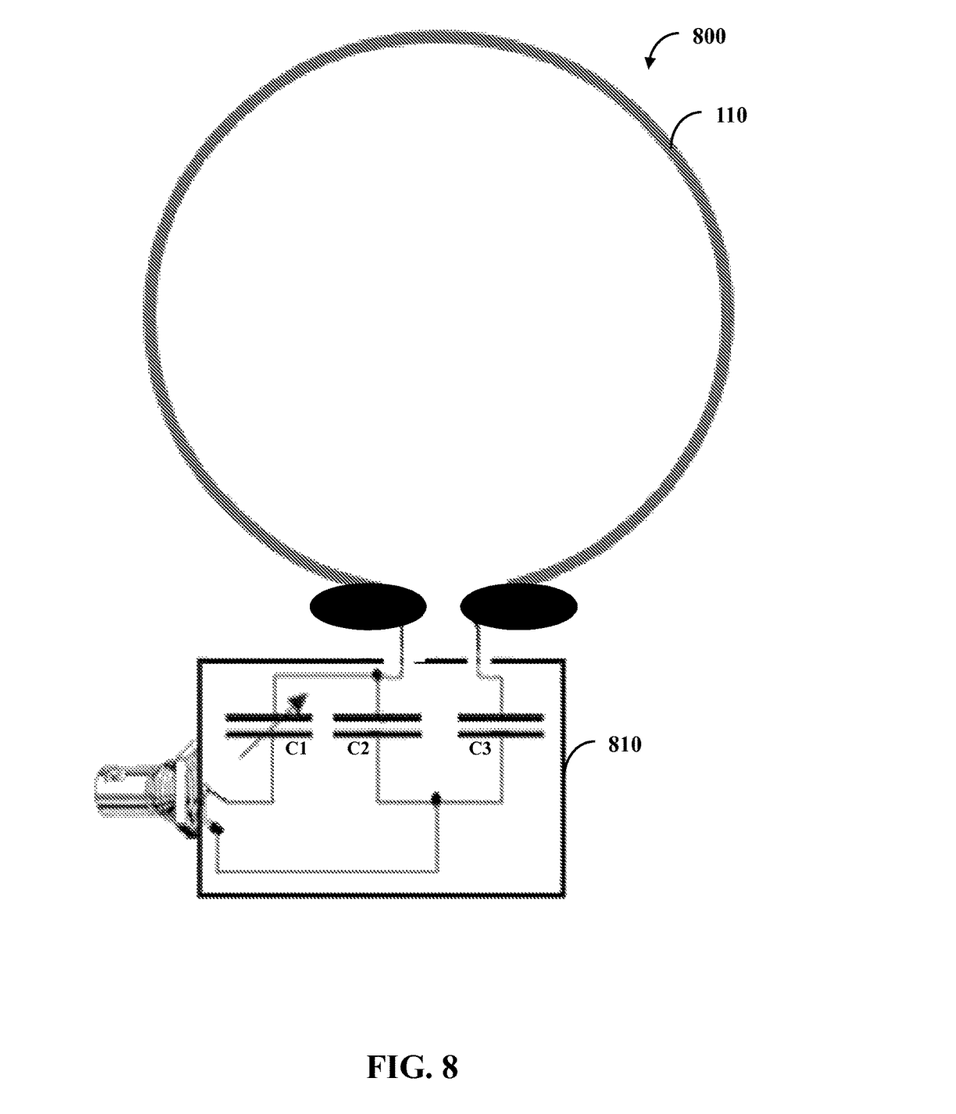
FIG. 8 illustrates one embodiment of a system comprising the loop and an application area.

FIG. 8 illustrates one embodiment of a system comprising the loop 110 and an application area 810. The application area 810 can be a hardware box that retains various items, such as the tuning and matching circuits 310 of FIG. 3 as three capacitors—C1, C2, and C3. These three capacitors can form an impedance matching network that approximately translates a reactive shift presented by the loop 110. Further, the application area 810 can retain various other hardware disclosed herein, such as the processor 1110 and/or the non-transitory computer-readable medium 1120 discussed below with regard to FIG. 11. In one example, the application area is able to locate a hot spot around the loop 110 where detection performance can greatly increase. The hot spot can be at different locations depending on the object.

Figure 9:
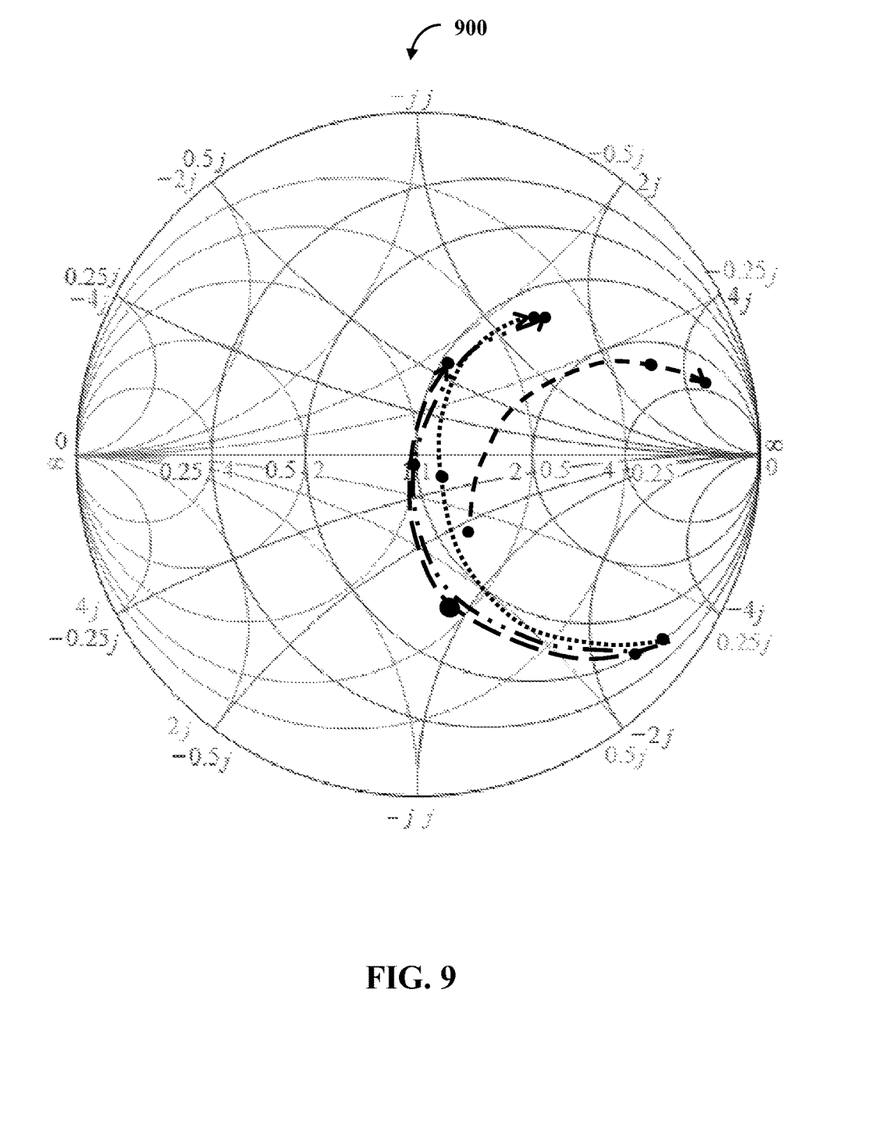
FIG. 9 illustrates one embodiment of a Smith chart with example responses based on an object.

FIG. 9 illustrates one embodiment of a Smith chart 900 with example responses based on potential presence of the object. Four example responses for the Smith chart 900 are provided: no object (combination dashed and dotted line), a ferrite object (shorter dashed line), a metal (longer dashed line), and a polyethylene (dotted line). The Smith chart can have an increasing frequency, such as through a clockwise rotation (e.g., the arrows of the responses travel clockwise). The Smith chart 900 can be configured such that positive values converge to the right and negative values converge to the left. The detection component 120 of FIG. 1 can employ the Smith chart 900 to determine if an object is present and/or what specific object is present.

As an example use of the Smith chart 900 the loop 110 of FIG. 1 can be tuned to, and thus operate at, a frequency of 24.052 MHz. With no object the Zin can be 50 Ohms while the zin can be 1. The Zin can be the actual value while the zin can be a scaled version to a base of 1. The ferrite object can have a Zin of 113+j160 Ohms and a zin of 2.26+j3.2. Similarly, the polyethylene can have a Zin of 44-j2.6 Ohms and a zin of 0.88-j0.05. Conversely the metal can have a Zin of 40-j47 Ohms and a zin of 0.8-j0.94. Thus, the Zin and zin go in one direction for the metal as compared to no object and in another direction with the ferrite, while the polyethylene can have little effect on the frequency response. The Smith chart 900 can be retained in a memory.

Figure 10:
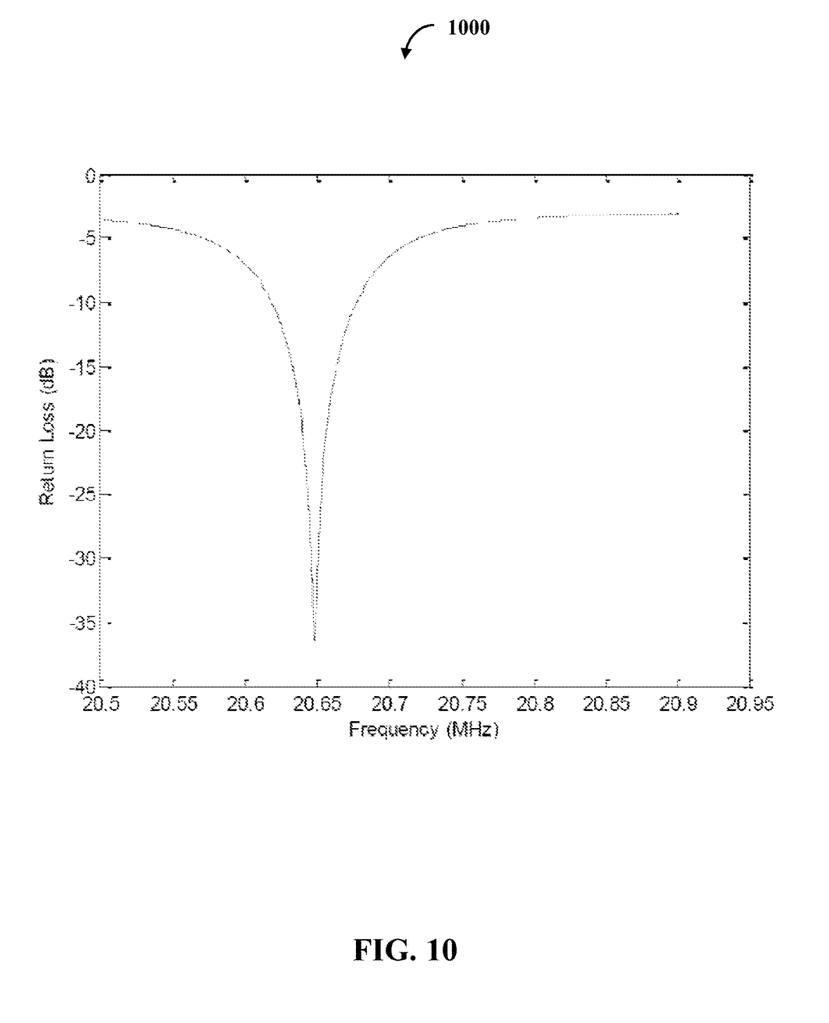
FIG. 10 illustrates one embodiment of a graph that shows a frequency notch.

FIG. 10 illustrates one embodiment of a graph 1000 that shows the frequency notch. The frequency notch (e.g., a reflection notch) can be where a maximum return loss for the loop 110 of FIG. 1 occurs. In one embodiment, the frequency notch can move left if a non-metal object is detected and move to the right if a metal object is detected.

Figure 11:
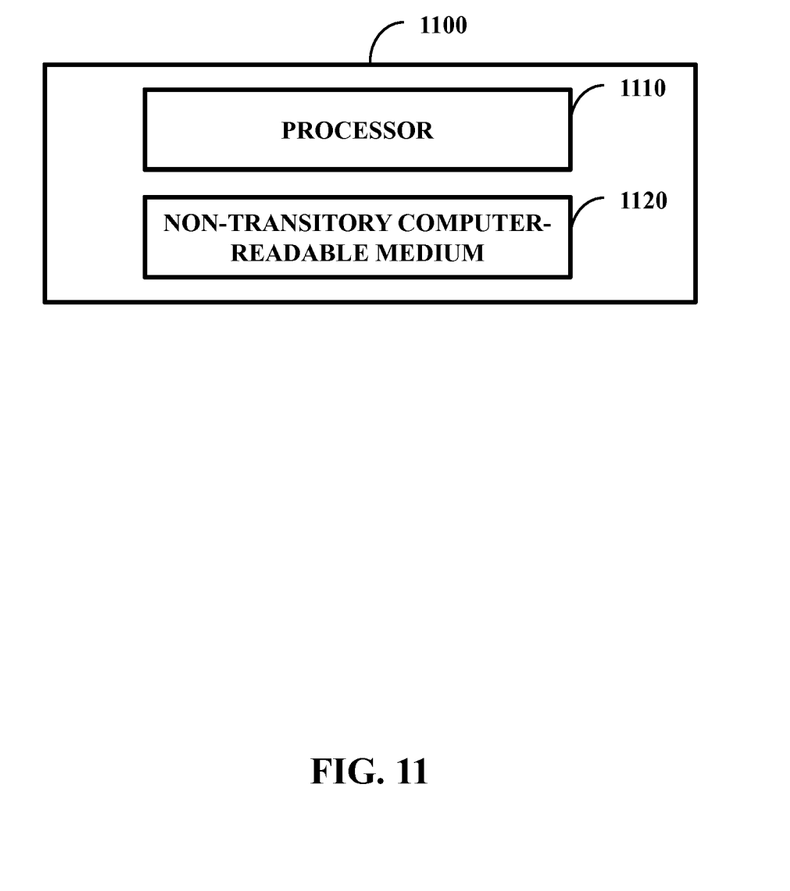
FIG. 11 illustrates one embodiment of a system comprising a processor and a non-transitory computer-readable medium.

FIG. 11 illustrates one embodiment of a system 1100 comprising a processor 1110 and a non-transitory computer-readable medium 1120. In one embodiment the non-transitory computer-readable medium 1120 is communicatively coupled to the processor 1110 and stores a command set executable by the processor 1110 to facilitate operation of at least one component disclosed herein (e.g., the detection component 120 of FIG. 1). In one embodiment, at least one component disclosed herein (e.g., the tuner component discussed with regard to FIG. 1) can be implemented, at least in part, by way of non-software, such as implemented as hardware by way of the system 1100. In one embodiment, the non-transitory computer-readable medium 1120 is configured to store processor-executable instructions that when executed by the processor 1110, cause the processor 1110 to perform a method disclosed herein (e.g., the method 1200 discussed below).

Figure 12:
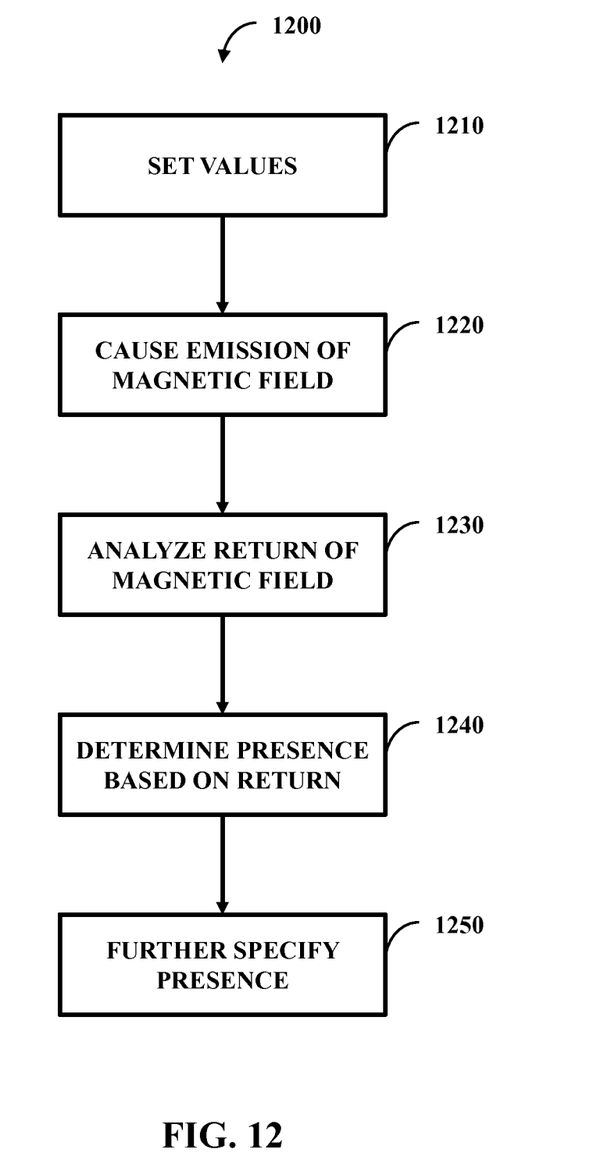
FIG. 12 illustrates one embodiment of a method comprising five actions.

FIG. 12 illustrates one embodiment of a method 1200 comprising five actions 1210-1250. At 1210, values can be set for the capacitors C1, C2, and C3 as discussed above. This can be done in constructing a system and/or be changed mechanically or electronically though use of a variable capacitor. At 1220, the loop 110 of FIG. 1 can be supplied a current (e.g., a current of about 1 Amp or greater), which can cause emission of a magnetic field from the loop 110 of FIG. 1. Emission of this magnetic field can be in the longitudinal direction. At 1230, the loop 110 of FIG. 1 can capture a return of the magnetic field. At 1240, the detection component 120 of FIG. 1 can determine the presence of the object based on the return of the magnetic field, such as through comparison of the frequency notch from the emitted field against the returned field. The presence can be further specified at 1250, such as a determination of a non-metal/metal or further specificity such as between a ferrite object and a polyethylene.

What is claimed is:

1. A system, comprising:
    a loop configured to emit a magnetic field along a longitudinal axis of the loop, where the loop operates at a frequency of 100 kilohertz or greater; and
    a detection component configured to detect a presence of an object through an analysis of the magnetic field,
    where the loop receives a returned magnetic field that is a returned version of the magnetic field that is emitted and
    where the detection component is configured to detect the presence of the object, at least in part, through a recognition of an impedance plot change between the emitted magnetic field and the returned magnetic field.

2. The system of claim 1, comprising:
    a real portion recognition component configured to recognize a real part of the impedance plot change; and
    an imaginary portion recognition component configured to recognize an imaginary part of the impedance plot change,
    where the recognition of the impedance plot change by the detection component occurs through use of the real part and the imaginary part.

3. The system of claim 2,
    where the real portion recognition component is configured to recognize the real part of the impedance plot change by way of a first tone and
    where the imaginary portion recognition component configured to recognize the imaginary part of the impedance plot change by way of a second tone that is different from the first tone.

4. The system of claim 1, where the recognition of the impedance plot change is performed through use of a reflection coefficient chart.

5. The system of claim 1,
    where the detection component is configured to detect the presence of the object, at least in part, through recognition of a frequency change between the emitted magnetic field and the returned magnetic field.

6. The system of claim 5, comprising:
a classification component configured to make a classification for the object based, at least in part, on a location of a frequency notch shift of a frequency notch that illustrates the frequency change.

7. The system of claim 6,
where the classification is as a metal when the frequency notch shift is at a first value,
where the classification is as a non-metal when the frequency notch shift is at a second value, and
where the first value and second value are different values.

8. The system of claim of claim 6,
where, absent the presence of the object, the frequency notch is at a base value,
where the classification is of a metal when the base value of the frequency notch increases, and
where the classification is of a non-metal when the base value of the frequency notch decreases.

9. The system of claim 6, where the frequency notch shift is produced from the object changing an impedance of the loop.

10. The system of claim 1,
where the detection component is configured to detect the presence of the object, at least in part, through recognition of an amplitude change between the emitted magnetic field and the returned magnetic field.

11. A system, comprising:
a loop configured to emit a magnetic field along a longitudinal axis of the loop, where the loop operates at a frequency of 100 kilohertz or greater;
a detection component configured to detect a presence of an object through an analysis of the magnetic field; and
a set of tuning and matching circuits configured to match an impedance of the loop with impedance of a power supply that supplies power to the loop.

12. The system of claim 11,
where the loop receives a returned magnetic field that is a returned version of the magnetic field that is emitted and
where the detection component is configured to detect the presence of the object through identification of a phase change between the emitted magnetic field and the returned magnetic field.

13. A system, comprising:
a transmission loop configured to emit a magnetic field along a longitudinal axis of the transmission loop, where the transmission loop operates at a frequency of greater than 100 kilohertz;
a reception loop configured to receive the magnetic field from the transmission loop; and
a detection component, operatively coupled to the reception loop, configured to detect a presence of an object through analysis of the magnetic field that is received from the transmission loop.

14. The system of claim 13,
where the detection component is configured to detect the presence of the object, at least in part, through a recognition of an impedance plot change between the emitted magnetic field and the magnetic field that is received from the transmission loop.

15. A system, comprising:
a singular loop that operates at a frequency of 1 megahertz or greater, where the singular loop is configured to emit a magnetic field along a longitudinal axis of the singular loop and where the singular loop functions concurrently as a transmission loop and as a reception loop;
an identification component configured to identify a new location for a frequency notch associated with the frequency based on reception of the magnetic field, where the frequency notch moves from a base location to the new location and where a change of the location from the base location to the new location indicates a presence of an object;
a classification component configured to determine a classification for the object based, at least in part, on the new location; and
an output component configured to cause an output associated with the classification.

16. The system of claim 15, comprising:
a set of tuning and matching circuits configured to match an impedance of the singular loop with a power supply that supplies power to the singular loop, where the classification is of a metal when the new location increases from the base location and where the classification is of a non-metal when the new location decreases from the base location.

17. The system of claim 16, where absent the presence of the object the frequency notch is at the base location and where the frequency notch shift is produced from the object changing an impedance of the singular loop.

18. A system, comprising
a loop, that operates at a frequency of 100 kilohertz or greater to 1 gigahertz or lower, configured to receive a magnetic field;
an identification component configured to identify a new location for a frequency notch associated with the frequency based, at least in part, on reception of the magnetic field, where the frequency notch moves from a base location to the new location and where the change of from the base location to the new location indicates an anomaly associated with the magnetic field; and
an output component configured to cause an output associated with the anomaly.

19. The system of claim 18, comprising:
a classification component configured to determine that the anomaly is a presence of an object and determine a classification for the object based, at least in part, on the new location; and
a tuning and matching circuits configured to match an impedance of the loop with a power supply that supplies power to the loop, where the classification is of a metal when the new location increases from the base location and where the classification is of a ferrite material when the new location decreases from the base location.

20. The system of claim 19, where the loop has more than one winding.

* * * * *